US012620638B2

(12) United States Patent
Holden et al.

(10) Patent No.: US 12,620,638 B2
(45) Date of Patent: May 5, 2026

(54) SAFETY MECHANISMS FOR A RECHARGEABLE BATTERY

(71) Applicant: Neutron Holdings, Inc., San Francisco, CA (US)

(72) Inventors: Mason Holden, San Francisco, CA (US); Nicholas Foley, San Francisco, CA (US); Andrew Titus, San Francisco, CA (US); Ashley Cooper, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 18/377,222

(22) Filed: Oct. 5, 2023

(65) Prior Publication Data

US 2024/0047770 A1     Feb. 8, 2024

Related U.S. Application Data

(62) Division of application No. 16/729,144, filed on Dec. 27, 2019, now Pat. No. 11,811,025.

(Continued)

(51) Int. Cl.
H01M 10/42        (2006.01)
B60L 50/64        (2019.01)
(Continued)

(52) U.S. Cl.
CPC ......... H01M 10/4257 (2013.01); B60L 50/64 (2019.02); H01M 10/486 (2013.01); H01M 50/249 (2021.01); H01M 50/581 (2021.01); H02J 7/00032 (2020.01); H02J 7/0047 (2013.01); H01M 2010/4271 (2013.01);
(Continued)

(58) Field of Classification Search
CPC ........... H01M 10/4257; H01M 10/486; H01M 10/482; H01M 50/581; H01M 50/578; H01M 50/584; H01M 50/20; H01M 50/249; H01M 50/202; H01M 2010/4271; H01M 2010/4278; H01M 2200/108;
(Continued)

(56) References Cited

U.S. PATENT DOCUMENTS

| | | | | |
|---|---|---|---|---|
| 2015/0333573 A1* | 11/2015 | Leabman | ................ | H02J 50/80 |
| | | | | 307/104 |
| 2019/0351776 A1* | 11/2019 | Du | ......................... | B60K 6/485 |
| 2021/0204338 A1* | 7/2021 | Han | ...................... | H04W 76/14 |

* cited by examiner

*Primary Examiner* — Raymond Alejandro
(74) *Attorney, Agent, or Firm* — Athorus, PLLC

(57)        ABSTRACT

This generally relates to one or more safety mechanisms of a rechargeable battery for light electric vehicles. The rechargeable battery may include a housing containing a battery management system and at least one battery cell, and a communication system communicatively coupled to the battery management system, where the communication system wirelessly communicates information received from the battery management system to a device external to the rechargeable battery. The rechargeable battery may include a housing formed of a first clamshell member and a second clamshell member. The rechargeable battery may include a first protrusion portion extending from an interior surface of the first clamshell member and a second protrusion portion extending from the interior surface of the second clamshell member toward the first protrusion portion such that the first and second protrusion portions physically contact one another when a force is applied to an external surface of the housing.

9 Claims, 11 Drawing Sheets

Related U.S. Application Data

(60) Provisional application No. 62/785,585, filed on Dec. 27, 2018.

(51) Int. Cl.

| | |
|---|---|
| *H01M 10/48* | (2006.01) |
| *H01M 50/249* | (2021.01) |
| *H01M 50/581* | (2021.01) |
| *H02J 7/00* | (2006.01) |
| *H04B 5/79* | (2024.01) |

(52) U.S. Cl.

CPC ............... *H01M 2010/4278* (2013.01); *H01M 2200/108* (2013.01); *H01M 2220/20* (2013.01); *H04B 5/79* (2024.01)

(58) Field of Classification Search

CPC ............. H01M 2220/20; H02J 7/00032; H02J 7/0047; H04B 5/79; H04B 5/0037; B60L 50/64

See application file for complete search history.

200

220

210

230

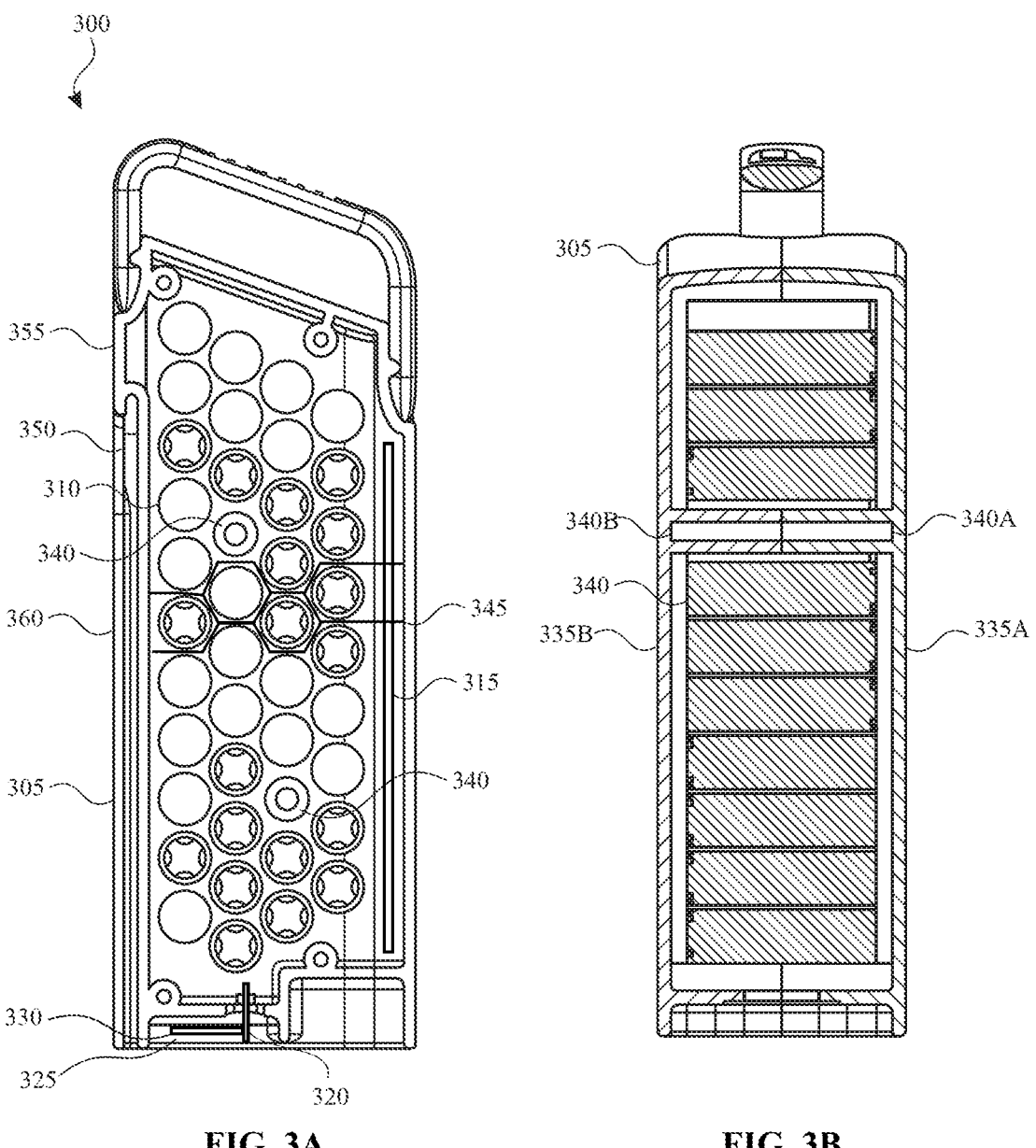
FIG. 3A                    FIG. 3B

800

RECEIVE ACCELERATION DATA — 810

FILTER ACCELERATION DATA — 820

FILTERED ACCELERATION DATA INDICATE UNSAFE CONDITION? — 830

NO

YES

RENDER RECHARGEABEL BATTERY SAFE — 840

STORE ACCELERATION DATA — 850

900

910
RECEIVE CONNECTOR DATA

920
FILTER CONNECTOR DATA

930
FILTERED CONNECTOR DATA INDICATE UNSAFE CONDITION?

NO

YES

940
RENDER RECHARGEABLE BATTERY SAFE

950
STORE UNSAFE CONDITION DATA

1000

SAFETY MECHANISMS FOR A RECHARGEABLE BATTERY

CROSS-REFERENCE TO RELATED APPLICATIONS

This application is a divisional application of U.S. patent application Ser. No. 16/729,144, which is a non-provisional of and claims priority to U.S. Provisional Application No. 62/785,585, filed on Dec. 27, 2018, entitled "SAFETY MECHANISMS FOR A RECHARGEABLE BATTERY," all of which are hereby incorporated by reference in their entirety for all purposes.

BACKGROUND

Electric vehicles (e.g., scooters, bicycles, etc.) are typically powered by a power source such as, for example, a rechargeable battery. In some cases, the rechargeable battery may be removably coupled to an electric vehicle. This enables a user to swap a rechargeable battery with little or no remaining power with another rechargeable battery (e.g., one that has more power or has been fully charged). However, as the rechargeable batteries are swapped, they may become damaged (e.g., by a user inadvertently dropping the rechargeable battery).

SUMMARY

Light electric vehicles (e.g., scooters, bicycles, etc.) are typically powered by a power source such as, for example, a rechargeable battery. In some cases, the rechargeable battery may be removably coupled to a light electric vehicle which enables an individual to swap a rechargeable battery with little or no remaining power with another rechargeable battery (e.g., one that has more power or has been fully charged).

When a battery swap occurs, an individual may remove the rechargeable battery from the light electric vehicle, place the removed rechargeable battery in charging station, select a new rechargeable battery, and secure the new rechargeable battery to the light electric vehicle. However, as the individual is carrying the rechargeable battery from the light electric vehicle to the charging station, or vice versa, the individual may inadvertently drop the rechargeable battery which may damage the rechargeable battery.

Additionally, rechargeable batteries for light electric vehicles are typically located outdoors. As such, the rechargeable batteries may be exposed to various weather conditions, vandalism, theft, and other damage (either intentional damage or accidental damage).

Accordingly, the present application describes various safety features for a rechargeable battery that may be used with a light electric vehicle. For example, the present application describes a structure of a rechargeable battery housing and a handle for the rechargeable battery that may be removed from the rechargeable battery when a threshold amount of force is applied to the handle. The removable handle may prevent a thief from gaining sufficient leverage to pry or otherwise remove and steal the rechargeable battery from the light electric vehicle or charging station.

The rechargeable battery described herein may also include an accelerometer(s) that detects or otherwise measures an acceleration of the rechargeable battery. The measurements taken by the accelerometer may be used to determine whether the rechargeable battery has been dropped or thrown. If the measurements indicate that the rechargeable battery has been dropped or thrown (e.g., so as to have caused damage to the rechargeable battery), a battery management system of the rechargeable battery may disconnect one or more battery cells of the rechargeable battery from a battery connector to prevent the battery cells from discharging and/or charging.

The rechargeable battery described herein may also include one or more temperature sensing devices that detects or otherwise measures a temperature associated with one or more rechargeable battery components. The measurements taken by the temperature sensing device may be used to determine whether the rechargeable battery is experiencing an unsafe event. If the measurements indicate that the rechargeable battery is experiencing an unsafe event, a battery management system of the rechargeable battery may disconnect one or more battery cells of the rechargeable battery from a battery connector to prevent the battery cells from discharging and/or charging.

The housing of the rechargeable battery may also have various safety features. For example, the housing may include various structures that improve the integrity of the housing. These structures may include various horizontal posts positioned at various points within the housing. Each of these horizontal posts act to strengthen crush resistant properties of the housing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 3A-3B illustrate cross-sectional views depicting internal components of a rechargeable battery according to one or more examples.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a rechargeable battery for a light electric vehicle (e.g., scooters, bicycles, etc.). The rechargeable battery may be removable from the light electric vehicle and placed in a kiosk (also referred to herein as a battery kiosk) to receive a charge. Each of the rechargeable batteries in the battery kiosk may be swapped for other rechargeable batteries with little or no remaining power. For example, as an individual uses a light electric vehicle, power stored by the rechargeable battery of the light electric vehicle may be consumed and, if not recharged, eventually depleted. Once this occurs, the individual may remove the rechargeable battery from the light electric vehicle and use the battery kiosk to exchange the depleted rechargeable battery for a rechargeable battery having a full charge or otherwise available to the individual. That is, the individual may swap the depleted rechargeable battery with one that is fully charged or mostly fully charged. To help ensure or increase the probability that the battery being taken from the kiosk is in good condition, the rechargeable battery may communicate with the kiosk, light electric vehicle, and/or a mobile device (e.g., through a network service) to inform the kiosk of one or more battery parameters relating to the condition of the rechargeable battery. The condition may correspond to an acceleration force experienced by the rechargeable battery, such as a drop and/or involvement in a crash event. To help protect the rechargeable battery from instances of theft when locked and/or latched in place at the light electric vehicle or the charging kiosk, the rechargeable battery may include a detachable handle that releases from the rechargeable battery during an attempted forcible removal.

Figure 1:
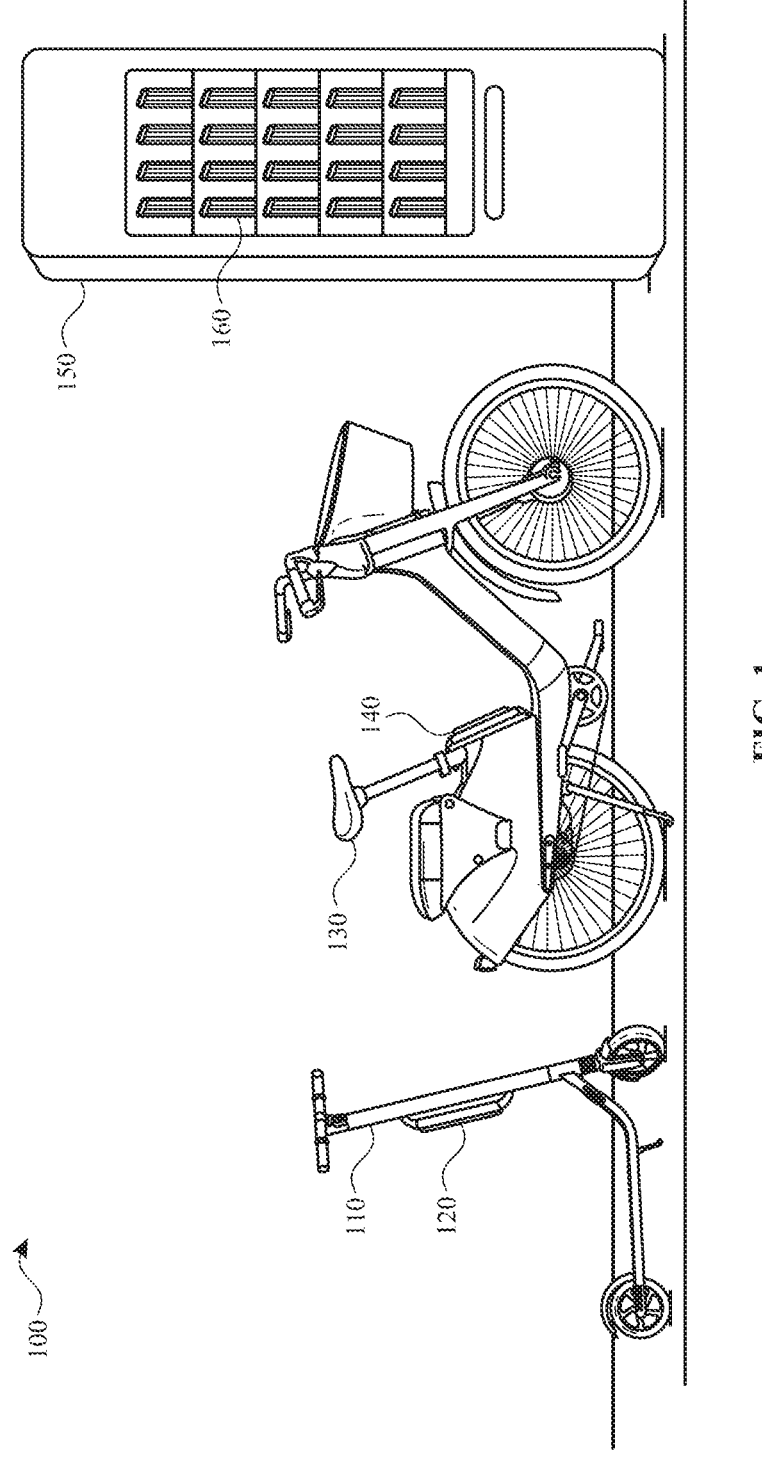
FIG. 1 illustrates an example environment in which a rechargeable battery kiosk receives and distributes rechargeable batteries for different kinds of light electric vehicles according to one or more examples.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables a user, using a client application executing on a computing device, to locate, request, and/or reserve (e.g., rent or borrow for a duration of time) one or more light electric vehicles.

In some examples, the network service includes one or more computing systems or servers that are remote from the computing device of the user and the light electric vehicles.

The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the user receives, from the network service over the network communication channel, information about a location of one or more of the light electric vehicles. The location of each of the light electric vehicles can then be provided on a user interface of the client application.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application displays the location information of the user and the light electric vehicles as different icons (or other such representations). Once the location information is displayed, the user may select an icon representing a type of light electric vehicle (e.g., an icon for an electric scooter 110 or an icon for an electric bicycle 130). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every 5 minutes, every 10 minutes, etc.). In yet other examples, the location tracking system may track the location of the light electric vehicle in real-time or substantially real-time when the light electric vehicle is rented or otherwise used by a user and may track location information at periodic intervals when the light electric vehicle has been reserved or is otherwise not is use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the user. This information may include a profile of the user (e.g., username, contact information, etc.) security credentials of the user (e.g., a password), historical usage data, payment information and the like.

The one or more computing systems of the network service may also include a matching system. The matching system receives, manages or otherwise handles various requests from the user. The requests may include light electric vehicle rental requests and light electric vehicle reservation requests. For example, when a vehicle rental request is received from the client application executing on the user's computing device, the matching system may communicate with the location tracking system and determine which light electric vehicle should be matched with or otherwise assigned to the requesting user.

The one or more computing systems of the network service may also include a payment system that processes payment information of the user. For example, when a user rents and uses a light electric vehicle, the user may be charged for the usage based on a duration of use and/or a travel distance. Once the user has finished using the light electric vehicle (e.g., by arriving at their intended destination, a check-in point, a battery kiosk 150, etc.), the payment system may automatically process the payment information of the user.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or more motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual user may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the user. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the light electric vehicle's current battery with another rechargeable battery housed by the rechargeable battery kiosk 150, thereby enabling the light electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on a light electric vehicle and wants or needs to exchange the light electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using a light electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, and/or an amount of rechargeable batteries currently available at the rechargeable battery kiosk.

Figure 2:
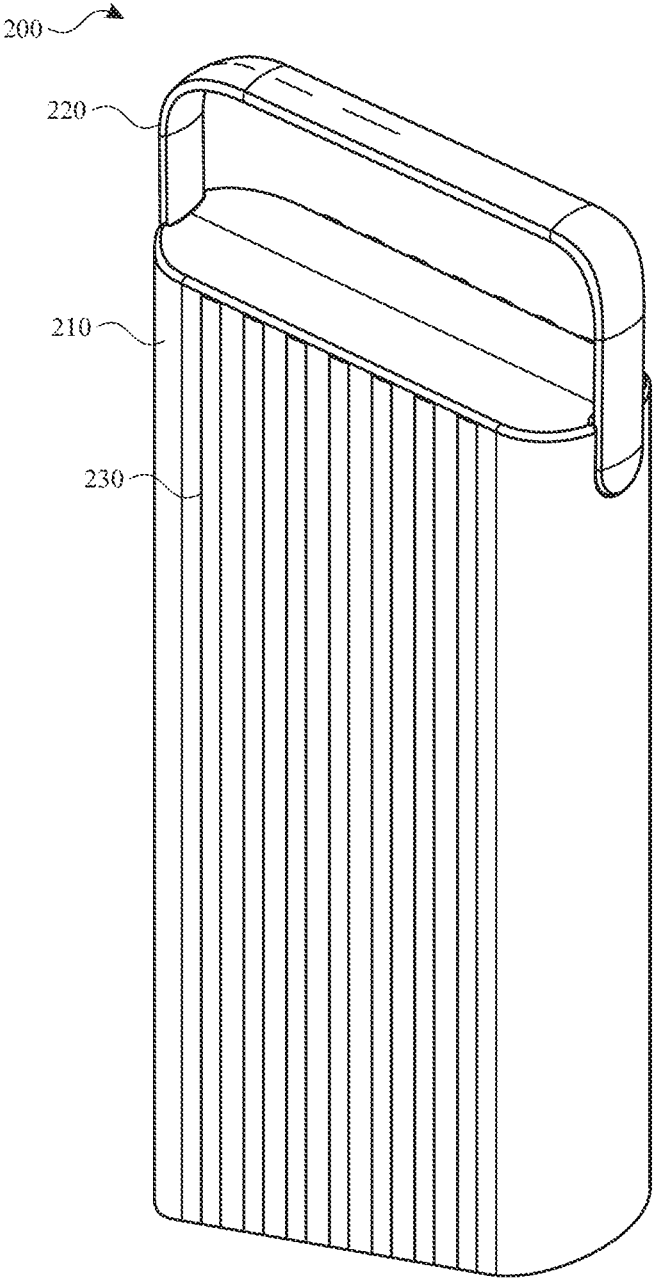
FIG. 2 illustrates an example rechargeable battery housing including a removable handle and one or more structural components according to one or more examples.

FIG. 2 illustrates a rechargeable battery 200 according to an example. The rechargeable battery 200 can correspond to the rechargeable battery 160 as described in FIG. 1. The rechargeable battery 200 may be received in one or more of the battery holsters 120 and 140 when in use by the electric scooter 110 or the electric bicycle 130, respectively. In addition, the rechargeable battery 200 may be received at one or more battery bays of the battery kiosk 150. The rechargeable battery 200 may include a battery housing 210 enclosing internal components of the rechargeable battery 200. For example, the battery housing 210 may enclose a plurality of battery cells, a battery management system, one or more rechargeable battery sensors, and a battery communication system. In some examples, the rechargeable battery 200 includes a handle 220 that is removably attached to the housing 210. In other examples, the handle 220 is fixed to the housing 210 and/or form a part of the housing 210. The handle 220 may assist a user when removing from or placing the rechargeable battery 200 into one or more of the battery holsters 120 and 140. Further, the handle 220 may assist a user when transporting the rechargeable battery 200. In addition, the handle 220 may assist a user when removing from or placing the rechargeable battery 200 into one or more battery bays of the battery kiosk 150.

In addition, the handle 220 may reduce occurrences of rechargeable battery theft when such theft occurrences involve attempts to forcibly detach or remove a securely locked rechargeable battery 200 from the battery holster 120/140 or battery bay of the battery kiosk 150. For example, an amount of force required to remove the rechargeable battery 200 from the battery holster 120/140 when the rechargeable battery 200 is securely locked in place in or with the battery holster 120/140 may be greater than an amount of force required to detach, remove, or break the handle 220 of the rechargeable battery 200, thereby at least partially separating the handle 220 from the housing 210. Similarly, an amount of force required to remove the rechargeable battery 200 from a battery bay of the battery kiosk 150 when the rechargeable battery 200 is securely locked in place at the battery bay of the kiosk 150 may be greater than an amount of force required to detach, remove, or break the handle 220 of the rechargeable battery 200, thereby at least partially separating the handle 220 from the housing 210. Therefore, an attempted theft of the rechargeable battery 200 may result in the removal of the handle 220, but not in the removal of the housing 210 from the battery holster 120/140 and/or a battery bay of the battery kiosk 150.

The housing 210 of the rechargeable battery 200 may also include one or more ribs 230. The one or more ribs 230 may be provided on certain portions (e.g., one or more side portions of the housing 210) or may be provided around the entire perimeter of the housing 210. In some examples, the one or more ribs 230 may be visible on the outside of the housing 210 while in other examples, the one or more ribs may be formed on the inside of the housing 210 and, as a result, be hidden from view.

In some examples, the one or more ribs 230 may have a vertical orientation and act as a structural support component to resist compressive forces applied to the top and/or bottom of the housing 210 and aid in the crush resistance of the housing 210. For example, when a compressive force is applied to the top of the housing 210 thereby pressing inward on the housing 210, the one or more ribs may increase the compression force between the top of the housing 210 and the bottom of the housing 210 that is required to cause damage to the housing 210 or one or more components enclosed by the housing 210.

Turning now to FIGS. 3A and 3B, cross-section views of a rechargeable battery 300 are depicted according to examples of the present disclosure. The rechargeable battery 300 can correspond to the rechargeable battery 160 or 200 as described in FIG. 1 or 2, respectively. The cross-section views of the rechargeable battery 300 depict structural as well as functional components of the rechargeable battery 300. One or more components of the rechargeable battery 300 are enclosed by the housing 305. The housing 305 may be the same as or similar to the housing 210. For example, the housing 305 may enclose a plurality of battery cells 310 and one or more circuit boards or modules (referred to herein as circuit board 315). The circuit board 315 may include components of a battery management system (BMS) that monitors the health and/or status a health of the rechargeable battery 300. Moreover, the circuit board 315 may include a switch to enable the plurality of battery cells 305 to receive charge during a charging process and/or provide charge during a discharge process through terminals 320 located in a connector and communication assembly 325 coupled to an external connector. The switch may include one or more transistors, such as a power MOSFET, and/or one or more mechanical switching assemblies, such as but not limited to an electronic relay. The circuit board 315 may include a fusible link that may temporarily, or permanently, interrupt a connection between the one or more switches and the one or more of the battery terminals 320. The housing 305 may further enclose one or more components of a communication system including a near field communication (NFC) antenna 330.

The housing 305 may be of a clamshell design. That is, the housing 305 may include two or more components, such as a first side 335A and a second side 335B. The housing 305 may include crush resistance portions referred to as posts 340. As shown in FIG. 3A and FIG. 3B, the posts 340 may have a horizontal orientation and be located or positioned throughout an interior space of the rechargeable battery 300. Similar to the ribs 230 of FIG. 2, the posts 340 may act as a structural support component to resist compressive forces applied to side portions of the housing 305 and to aid in the crush resistance of the housing 305. As depicted in FIG. 3B, one or more posts 340A may be formed as part of a first side 335A of the housing 305 while one or more second posts 340B may be formed as part of the second side 335B. Accordingly, when the two sides 335A and 335B are put together thereby defining an interior space of the housing 305, the posts 340A and 340B on opposing sides of the housing 305 may contact one another or otherwise be in close proximity to one another. In instances where an external compressive force is applied to either or both side 335A and side 335B, the posts 340A and 34B may aid to resist the compressive force thereby increasing a crush resistance of the battery housing 305.

Alternatively, or in addition to the posts 340, one or more structural portions 345 may be included within the interior of the housing 305. The one or more structural portions 345 may be located through the interior space of the rechargeable battery 300 and may act as a structural support component to resist compressive forces applied to side portions of the housing 305 other than, or generally perpendicular to, side portions 335A and 335B, to aid in the crush resistance of the housing 305. Moreover, the structural support portions 345 may be utilized as a battery cell locator to locate one or more of the battery cells 310. In some examples, the support portions 345 may be included as part of a battery cell carrier, and may be used to locate all battery cells 310 in a proper orientation and location inside and, in instances where the rechargeable battery 300 is being assembled or disassembled, outside of the housing 305.

The rechargeable battery 300 may include a recess portion that receives a connector and communication assembly 325 including the one or more terminals 320. For example, the recess portion may include one or more terminals 320 such as, but not limited to one or more power connectors, that electrically connect the rechargeable battery 300 to the light electric vehicle or to a charging bay of a charging kiosk 150. In addition, the rechargeable battery 300 may include a communication portion that includes one or more components of a communication system 330. The one or more components of the communication portion may include, but are not limited to an antenna such as an NFC antenna, a memory, and a processor which may be coupled to the circuit board 315, providing the rechargeable battery 300 with the ability to communicate with a device, such as a user mobile device, light electric vehicle, and/or charging kiosk 150. For example, the communication system 330 may be communicatively coupled to the circuit board 315 and may enable the rechargeable battery 300 to pass communications and/or information from/to a device external to the rechargeable battery 300.

The rechargeable battery 300 may include a recess portion 350 located between a first surface 355 and a second surface 360 of the housing 305. The recess portion 350 may include a portion of a locking mechanism utilized to secure the rechargeable battery 300 in the light electric vehicle (e.g., a holster 120/140 (FIG. 1)) or charging bay of a rechargeable battery kiosk 150. Accordingly, when in a locked position, a mating portion of the locking mechanism may engage the portion of the locking mechanism residing in the recess portion 350.

Figure 4A:
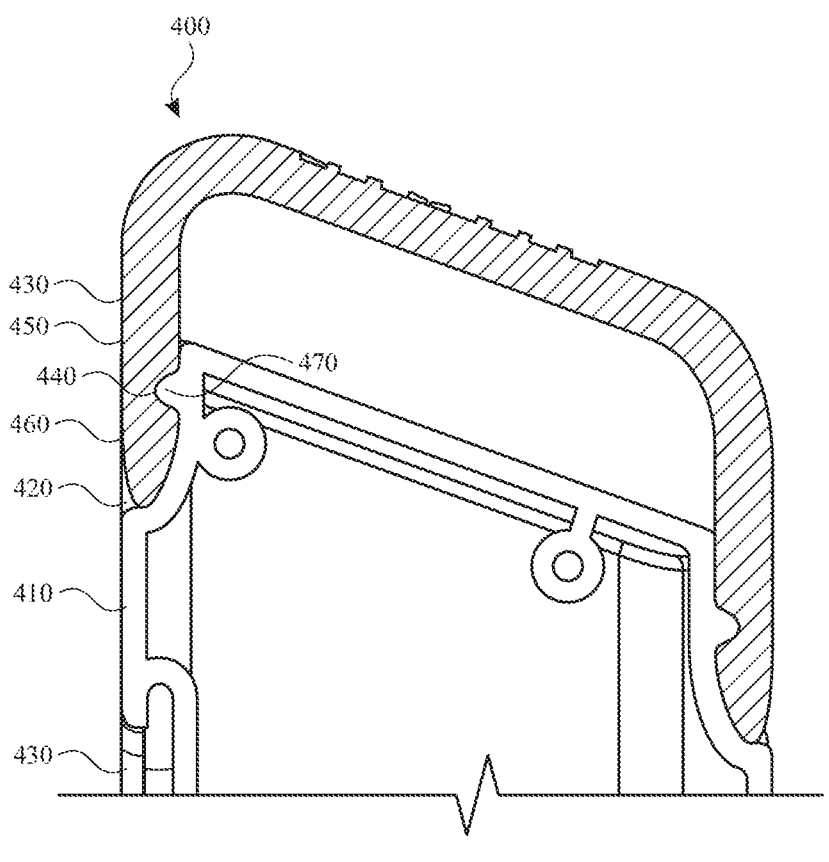
FIGS. 4A-4D illustrate additional details of a removable handle according to one or more examples.

Additional details of a handle 400 are provided in FIGS. 4A-4D. The handle 400 can correspond to the handle 200 as described in FIG. 2. As depicted in FIG. 4A, a rechargeable battery housing 410 may include a recess portion 420 that receives a first portion 430 of the handle 400. The first portion 430 of the handle 400 may include an indentation portion 440 located between an upper handle portion 450 and an end portion 460 of the handle 400, and mates with a protrusion portion 460 of the rechargeable battery housing 410. Accordingly, the first portion 430 of the handle 400 may snap in place or otherwise latch to a protrusion 470 and recess portion 420 of the rechargeable battery housing 410.

Figure 4B:
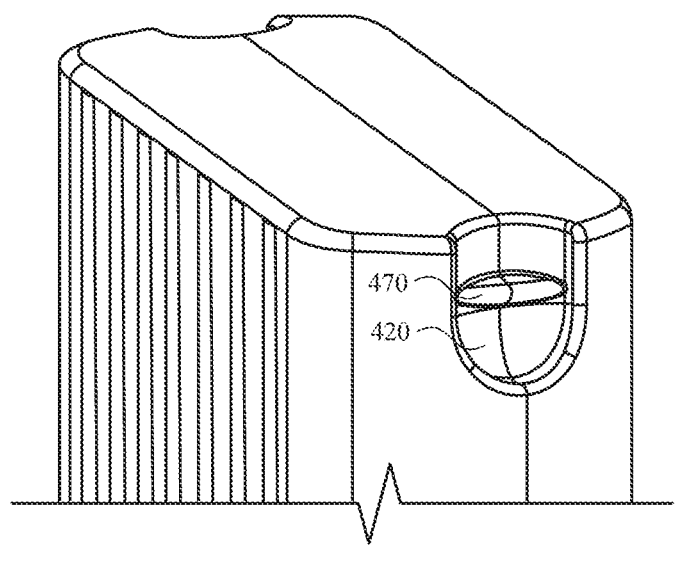

FIG. 4B depicts an isometric view of the battery housing 410 and further illustrates that the protrusion portion 470 may be located within the recess portion 420 of the rechargeable battery housing 410.

In accordance with examples of the present disclosure, when experiencing a leverage based theft attempt or attack, an amount of force required to detach the first portion 430 from the rechargeable battery housing 410 may be greater than an amount of force needed to pry the rechargeable battery housing 410 from a locking or latching mechanism previously described in FIGS. 3A and 3B. Accordingly, the handle 400 may simply detach from the rechargeable battery housing 410 and prevent a would-be perpetrator from removing the rechargeable battery from a battery bay of a rechargeable battery kiosk 150 (FIG. 1) and/or a holster 120/140 (FIG. 1) of a light electric vehicle.

Figure 4C:
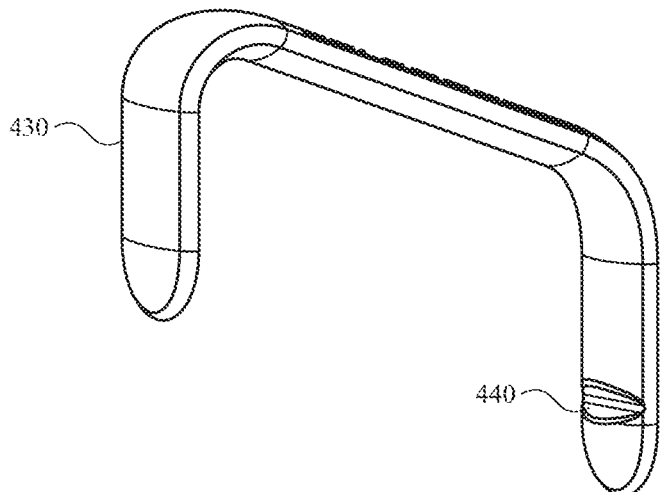

FIG. 4C generally depicts a three-dimensional view of the handle 400 detached from the rechargeable battery housing 410. In examples, the handle 400 may include a recess portion 440 at two ends of the handle 400. An amount of force required to detach one or both ends of the handle 400 from the rechargeable battery housing 410 may be the same or different at each end of the handle 400. Moreover, an amount of force required to detach one or both ends of the handle 400 may be a portion of an amount of force required to remove the rechargeable battery housing 410 from a locking or latching mechanism, pry the rechargeable battery housing 410 from the locking or latching mechanism, and/or break the locking or latching mechanism such that the rechargeable battery housing 410, and therefore, the battery portion is separated from the light electric vehicle or charging bay of a charging kiosk 150. An amount of force required to detach one or both ends of the handle 400 from the rechargeable battery housing 410 may be seventy-five percent of an amount of force needed to separate the rechargeable battery housing 410 from the light electric vehicle and/or charging bay of the charging kiosk 150 when in a locked or latched condition. As can be appreciated, seventy-five percent is provided for example purposes only and should not be considered limiting. Other examples include any value between zero and 100 percent. The locking or latching mechanism may be at least partially coupled to a plate located in a recess portion 480.

To prevent the rechargeable battery housing 410 from becoming disconnected from the handle 400 and possibly resulting in a drop or other rechargeable battery damaging event, in some examples, an amount of force required to separate one or both ends of the handle 400 from the rechargeable battery housing 410 must be greater than an amount of force exerted by a user when performing everyday tasks, such as removing the rechargeable battery from an unlocked or unlatched holster of a light electric vehicle or charging bay of a charging kiosk 150 and transporting the rechargeable battery from a first location to a second location. For example, a user may exert a certain amount of force on the handle 400 when carrying the rechargeable battery around using the handle 400, when holding the rechargeable battery by the handle 400, or when transporting the rechargeable battery from a first location to a second location using the handle 400. Therefore, the force required to disconnect the handle 400 from the rechargeable battery housing 410 should allow for normal handling and transportation of the rechargeable battery. Thus, the force required to disconnect the handle 400 from the rechargeable battery housing 410 may be greater than an amount of force exerted by a user during normal handling and transportation by a determined safety factor.

Figure 4D:
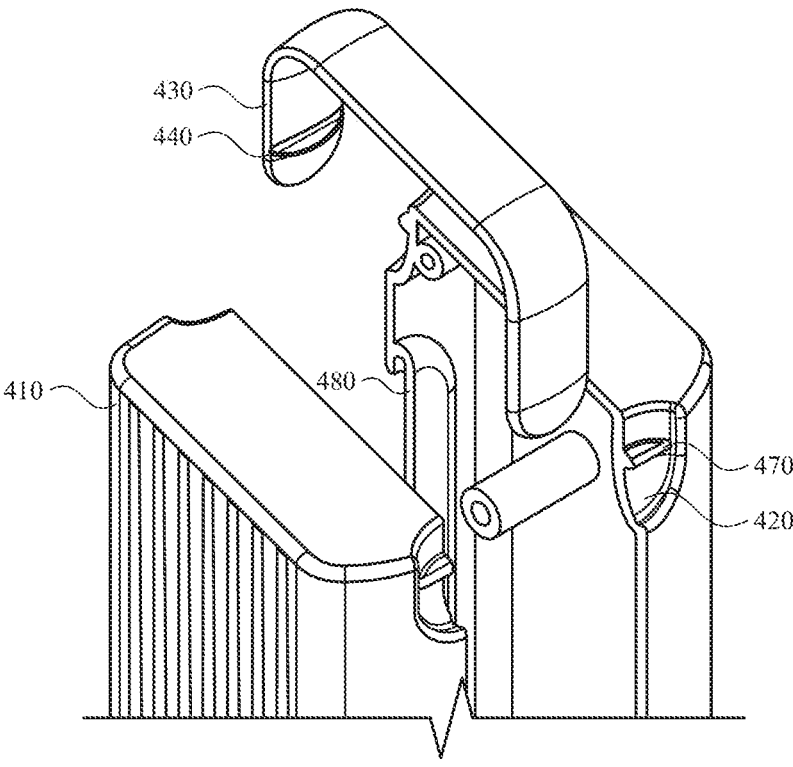

FIG. 4D generally depicts a three-dimensional view of the rechargeable battery housing 410 disassembled into one or more component parts. For example, the rechargeable battery housing 410 may be a clamshell design including a first portion and a second portion that are mutually engageable and, when engaged, define an interior for containing one or more previously described components of the rechargeable battery. As further depicted in FIG. 4D, the recess portion 420 and the protrusion portion 470 may be partially formed by each of the first and second portions of the rechargeable battery housing 410. Accordingly, the handle may snap in place or otherwise latch to a protrusion 470 and recess portion 420 formed by the first and second portions of the rechargeable battery housing 410. In accordance with examples of the present disclosure, while other detachable handles may be utilized with the battery housing 410, it should be appreciated that utilizing a handle 400 that is completely removable allows for the replacement of the handle without having to replace the battery housing 410. For example, if the handle is pried off during an attempted theft event, the handle could be replaced while leaving the housing 410 in place.

Figure 5A:
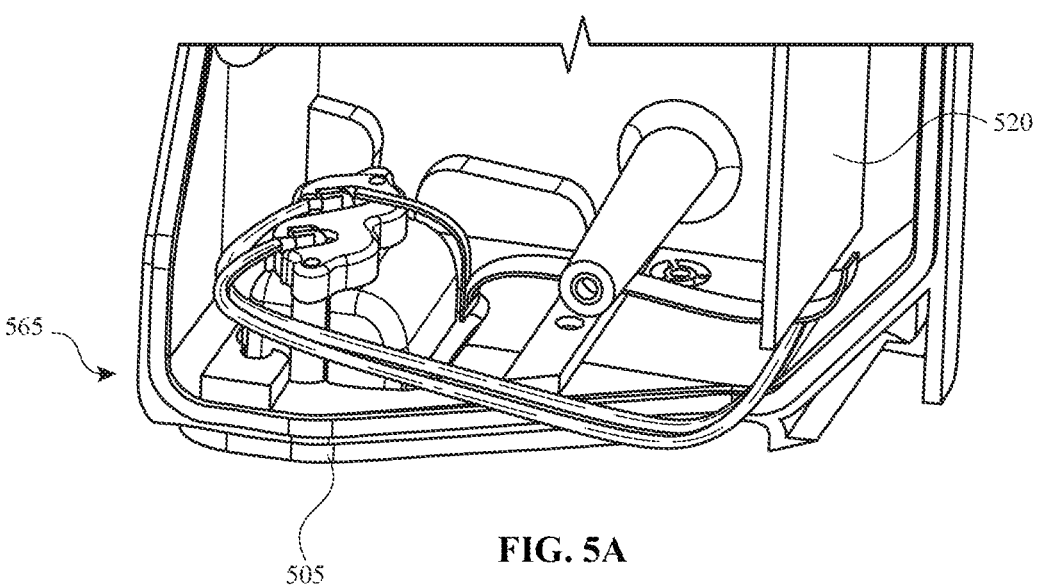
FIGS. 5A-5B illustrate additional details of communication system components, sensor components, and a location of one or more battery terminals of a rechargeable battery according to one or more examples.
Figure 5B:
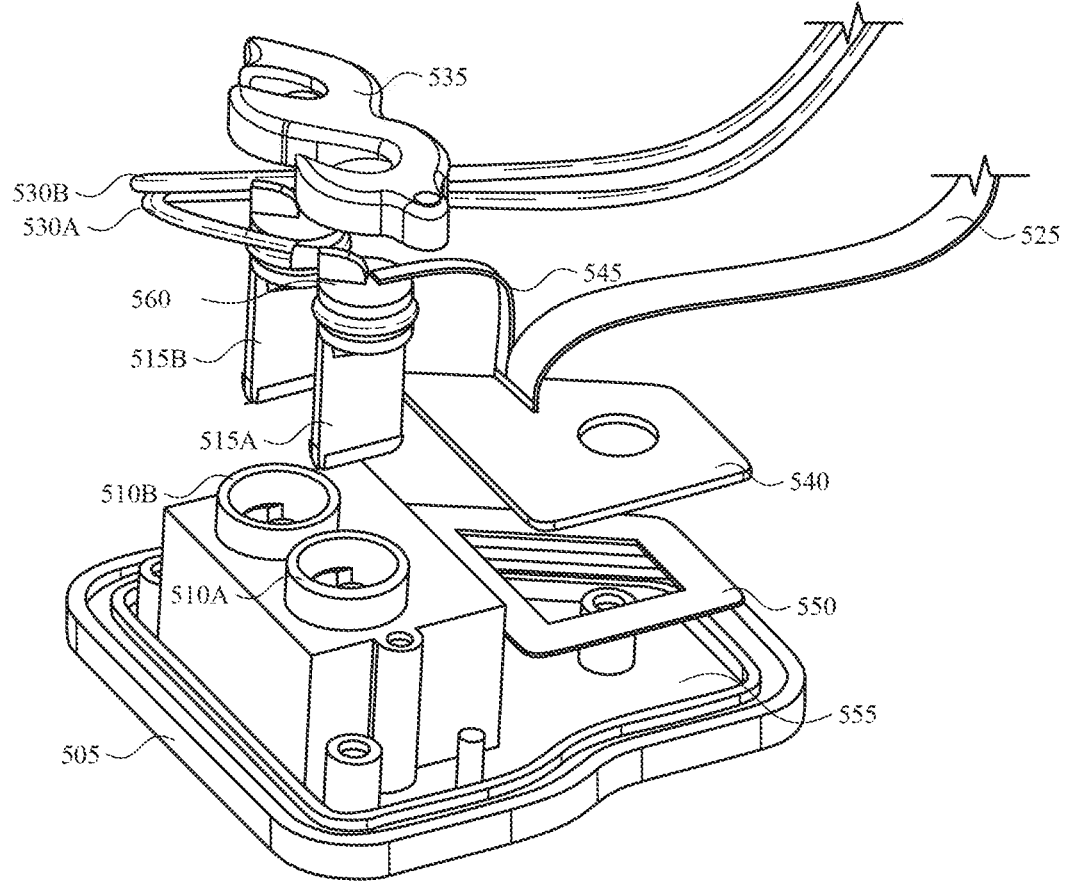

FIGS. 5A and 5B depict additional details of a connector and communication assembly 505 of the rechargeable battery in accordance examples of the present disclosure. The connector and communication assembly 505 can correspond to the connector and communication assembly 325, as described in FIG. 3A. The connector and communication assembly 505 may include a plurality of through-portions 510A and 510B that receive a corresponding terminal 515A/515B. The terminals 515A and 515B may be coupled to the circuit board, or module (referred to herein as circuit board 520) via a ribbon and/or cable 525. The circuit board 520 can correspond to the circuit board 315 as described in FIG. 3A. The terminals 515A and 515B may be coupled to a corresponding terminal coupling portion of a battery bay of a battering charging kiosk and/or of a rechargeable battery holster, such as the rechargeable battery holster 120 or 140 (FIG. 1). The terminals 515A and 515B may be coupled to the battery cells and/or one or more components of a battery management system, for example the circuit board, or module, 520, via the power cables 530A and 530B.

The terminals 515A and 515B may be coupled to one or more switches and/or one or more fusible links such that one or both of the terminals 515A and 515B may be disabled or otherwise disconnected from the battery cells and no charge can be transferred to/from the rechargeable battery. As one non-limiting example, one or more switches may disable or otherwise prevent the battery cells from providing charge when the rechargeable battery is outside of the light electric vehicle and/or battery bay of the charging kiosk 150. Accordingly, an unexpected battery discharge, for example caused by a short across the terminals 515A and 515B, may be prevented. Similarly, the one or more switches may disable or otherwise prevent the battery cells from receiving charge when the rechargeable battery has been charged to completion. As another example, when the rechargeable battery is determined to be defective and/or damaged, the fusible link may temporarily, or permanently, disable terminals 515A and/or 515B and prevent the rechargeable battery from providing and/or receiving charge. The one or more switches and/or the one or more fusible links may be controlled by a battery management system.

The connector and communication assembly 505 may include a retaining clip 535 to maintain the terminals 515A and 515B in a corresponding through-portion 510A and 510B. Power may be supplied to one or more components of a communication system, such as a communication circuit board or module (referred to herein as communication circuit board 540) via one or more power supply cables 545. The communication circuit board 540 may allow for any type of wireless communication from the rechargeable battery to an external device, such as a light electric vehicle, a mobile device, and/or a battery kiosk 150. An antenna 550 may reside between the communication circuit board 540 and a surface 555 of the connector and communication assembly 505. In some examples, the one or more power supply cables 545 may be coupled to the battery management system and/or battery cells such that the one or more of the switches and/or fusible links do not prevent the communication circuit 540 from functioning when the rechargeable battery has been determine to be defective and/or damaged; accordingly, rechargeable battery configuration, status, and fault information may be communicated to and from the rechargeable battery.

In examples, one or more of the terminals 515A or 515B may include a sensor 560 that measures an operating condition and/or status of the rechargeable battery. For example, the sensor 560 may be a thermistor and that measures a temperature of the terminal 515A. Accordingly, if a temperature of the terminal 515A is greater than a normalized operating temperature, such temperature increase may be indicative of a fault condition occurring at the rechargeable battery. For example, if terminal 515A is dirty, the terminal 515A may not make a solid or otherwise good connection to an external connector, such as one found in the holster 120 or 140 (FIG. 1) and/or a battery bay of a recharging kiosk 150.

If such condition is realized, the battery management system of the rechargeable battery may cause a communication to be sent to either a charging kiosk 150, mobile device, or other light electric vehicle. To remedy a dirty terminal 515A, a user or technician may need to clean the terminal when the rechargeable battery is in a safe operating status. Alternatively, or in addition, the sensor 560 may include an ammeter that measures an amount of current through the terminal 515A and/or power cable 530A. Alternatively, or in addition, the sensor 560 may be a voltage sensor that measures a voltage between the sensor 515A and 515B; in situations where the one or more switches and/or one or more fusible links disconnects the terminals 515A and/or 515B from the battery cells, a voltage sensor may be utilized to confirm the existence of zero voltage between the terminals 515A and/or 515B as a safety measure. The connector and communication assembly 505 may be inserted into an opening formed in a bottom, or lower portion 565 of the rechargeable battery housing together with a sealing member thereby providing a fully enclosed rechargeable battery.

Figure 6:
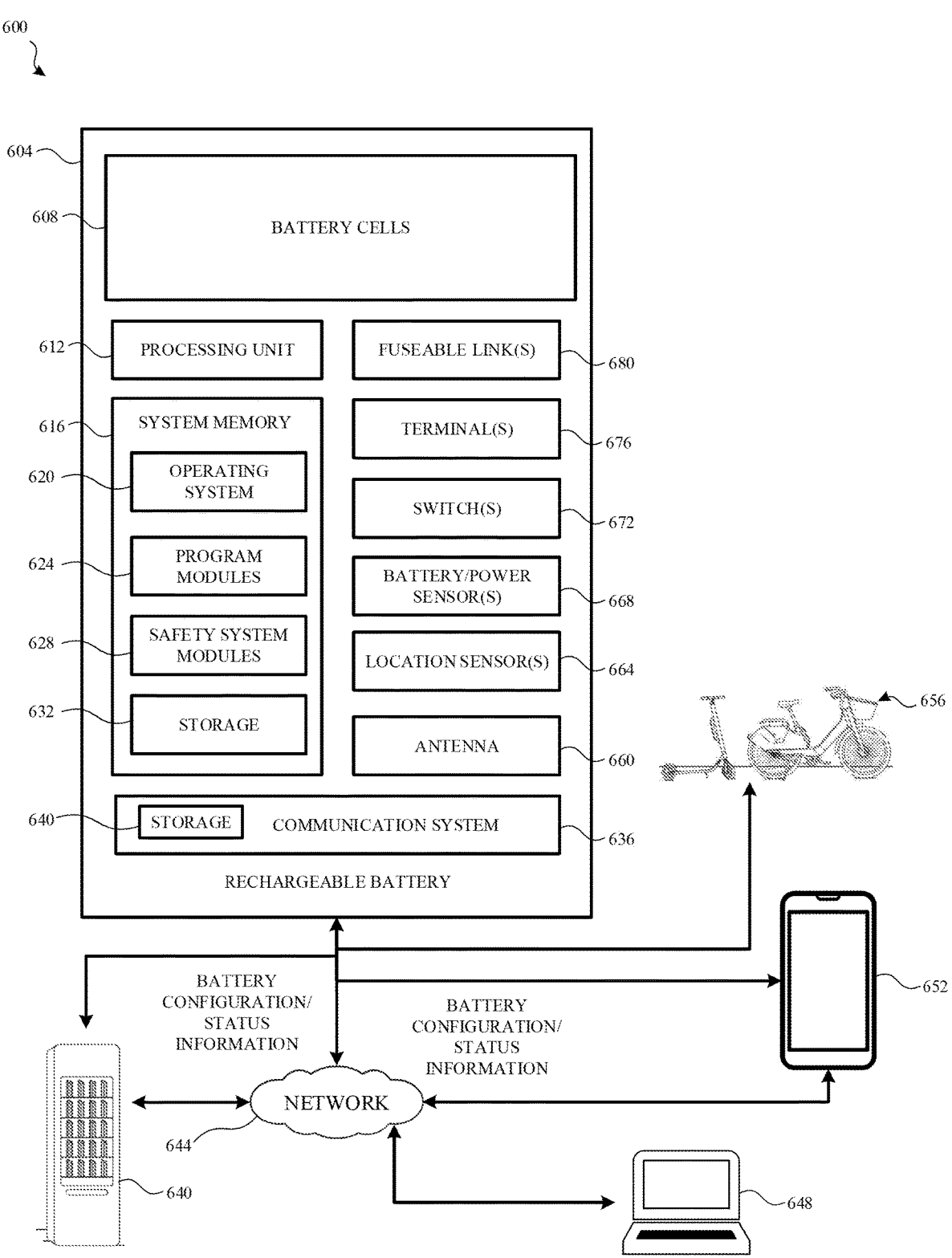
FIG. 6 illustrates additional details of the rechargeable battery according to one or more examples.

FIG. 6 is a system diagram of a rechargeable battery 604 according to one or more examples. In some examples, the rechargeable battery 604 can correspond to the rechargeable battery 160 shown and described with respect to FIG. 1. The rechargeable battery 608 may include at least one processing unit 612 and a system memory 616. The system memory 616 may include, but is not limited to, volatile storage (e.g., random access memory), non-volatile storage (e.g., read-only memory), flash memory, or any combination of such memories. The system memory 616 may also include an operating system 620 that controls the operation of the rechargeable battery 604 and one or more program modules 624. The program modules may be responsible for implementing one or more charging profiles while the safety system modules may implement one or more safety profiles or configurations. In some instances, the system memory 616 may include additional storage 632 that stores sensor information, location information, communication information, and/or other information directed to the rechargeable battery 604 operation and/or configuration. The processing unit 612 and the system memory 616 may form a portion of the previously described battery monitoring system. While executing on the processing unit 612, the program modules 624 and safety system modules 628 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the rechargeable battery 604 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The rechargeable battery 604 may include one or more communication systems 636 that enable the rechargeable battery 604 to communicate with one or more battery charging kiosks 640, networks 644, computing device 648, mobile device 652, and/or light electric vehicle 656. Examples of communication systems 636 include, but are not limited to, near-field communication (NFC) transmitter, receiver, and/or transceiver circuitry; radio frequency (RF) transmitter, receiver, and/or transceiver circuitry; cellular transmitter, receiver, and/or transceiver circuitry, and Bluetooth™ transmitter, receiver, and/or transceiver circuitry, and may include an antenna 644.

The communication system 636 may also include storage 640, separate and distinct from the system memory 616. Such storage may facilitate the exchange of rechargeable battery fault information; that is, in instances where the rechargeable battery may be rendered inoperable, the communication system 636 may operate in a passive mode such that fault information or other status information located in the storage area 640 may be provided to a technician via a power harvested from the antenna 660 for example.

In accordance with examples of the present disclosure, one or more of a charging function or a power output function may be dependent upon the communication system 636 communicating with a light electric vehicle 656, charging kiosk 640, or other device. For instance, the rechargeable battery 604 may become temporarily inoperable if the rechargeable battery 604 is not communicating with or otherwise in communication range of one or more devices, thereby minimizing a likelihood of an unintended power discharge event.

The rechargeable battery 604 may include one or more location sensors 664, such as global position systems (GPS), accelerometer, beacon location service, or other location sensor to obtain location information of the battery 604. Moreover, the communication system 636 may provide the location information to one or more of the battery kiosks 640, computing device 648, and mobile device 652 via a cellular connection for example. The location information may allow a technician or other individual to locate the rechargeable battery 604 in instances when the rechargeable battery 604 is not in the presence of a light electric vehicle or battery kiosk 640.

Moreover, a disassociation between the rechargeable battery 604 and a light electric vehicle 656, charging kiosk 640, or other authorized user/device may indicate that a theft event has occurred or is in the process of occurring. Accordingly, based on an indication of theft, the rechargeable battery 604 may render itself inoperable utilizing one or more switches 672 and/or one or more fusible links 680. In accordance with examples of the present disclosure, the one or more location sensors 664 may indicate a proximity to a specific location, such as a light electric vehicle 656, charging kiosk 640, or other device. Thus, one or more of a charging function or a power output function may be dependent upon the proximity of the rechargeable battery 604 to light electric vehicle 656, charging kiosk 640, or other device. For instance, the rechargeable battery 604 may become temporarily inoperable if the rechargeable battery 604 is not within a specified proximity to one or more devices, thereby minimizing a likelihood of an unintended power discharge event.

The rechargeable battery 604 may include one or more battery and/or power sensors 668. The battery and/or power sensors 668 may include the sensor 560 as previously discussed. Alternatively, or in addition, the battery and/or power sensors 668 may include any sensor for measuring and/or detecting an operating status and/or condition of the rechargeable battery 604. Non-limiting examples of the battery and/or power sensors 668 may include one or more accelerometers, battery temperature sensors, current sensors, voltage sensors, short sensors, and/or proximity sensors.

In some examples, data from a battery sensor 668, such as an accelerometer sensor, may be utilized to determine if the rechargeable battery 604 has been subjected to a damaging event, such as a drop, kick, crash etc. That is, an acceleration of the rechargeable battery may be tracked and/or measured to determine if the rechargeable battery 604 has been subjected to accelerations forces indicative of the drop, kick, or crash. If the rechargeable battery has been subjected to such an event, one or more switches 668 and/or one or more fusible links 680 may be activated such that the terminals 676 are disconnected from the battery cells 608. In some instances, acceleration data may need to be filtered such that measured accelerations associated with normal use of the light electric vehicle 656 do not cause a false positive thereby rendering the rechargeable battery 604, and therefore, the light electric vehicle 656, unusable.

Alternatively, or in addition, the acceleration data may be analyzed over time and classified as likely to cause damage or unlikely to cause damage. In instances where the one or more switch and/or one or more fusible link 656 have been activated thereby rendering the rechargeable battery 604 inoperable, a technician may render the battery operable again by communicating with the rechargeable battery 604 via the communication system 636. In some instances, the fusible link 680 may need to be replaced. While instances of operability have been described with respect to the rechargeable battery 604 being rendered operable, it should be understood that one or more components may be rendered inoperable while other components may still function. For example, an ability to provide a charge or receive a charge may be rendered inoperable while the communication system may operate to communicate with one or more devices.

Figure 7:
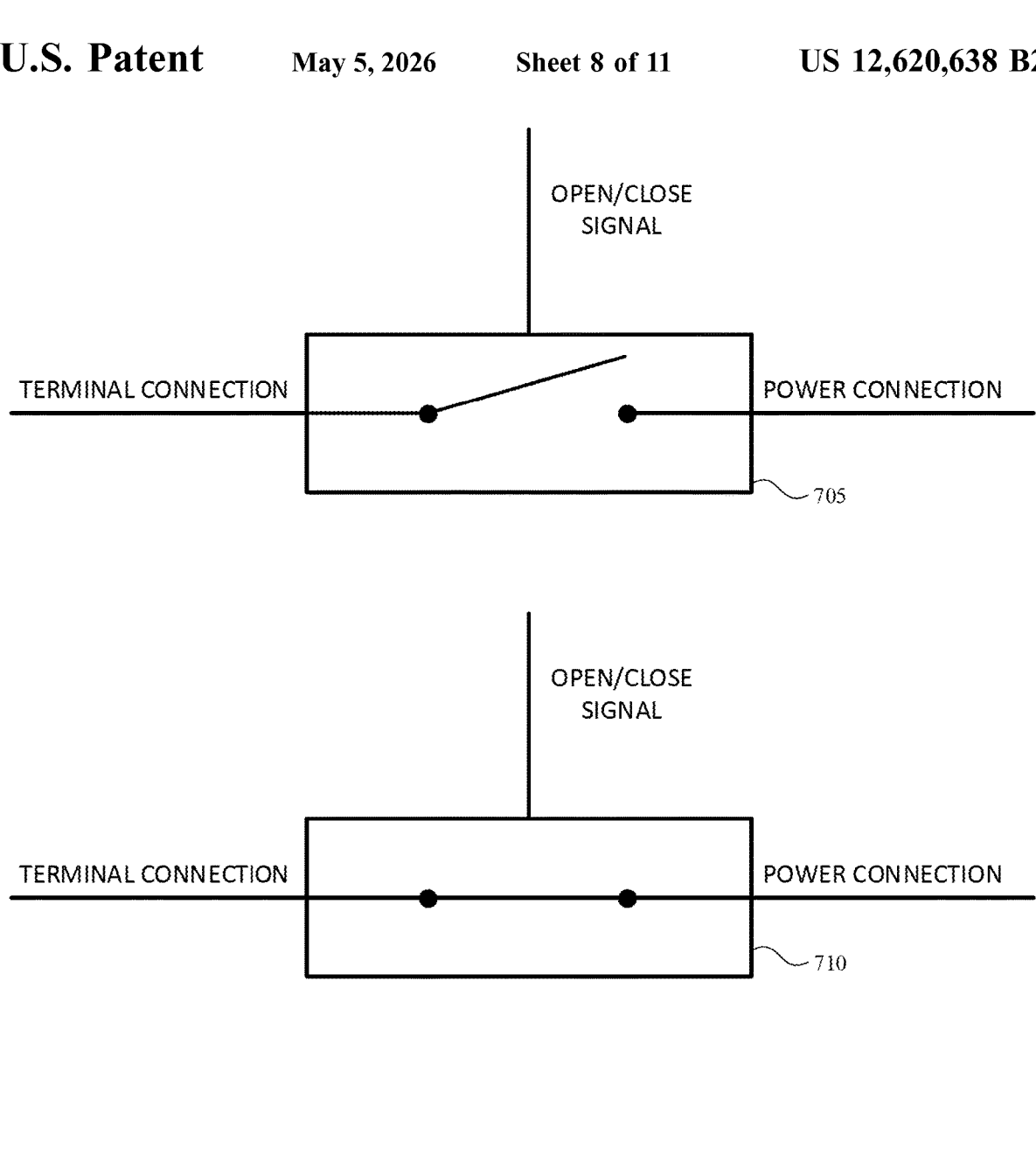
FIG. 7 illustrates switching components utilized to render the rechargeable battery inoperable according to one or more examples.

FIG. 7 depicts one or more components utilized to render the rechargeable device inoperable, either temporarily or permanently, in accordance with examples of the present disclosure. A switch 705 may reside between a power connection and a terminal 515A/515B; for example, the switch may reside within and/or providing an on/off capability for at least one of the power cables 530A/530B. Accordingly, the switch 705 may be responsive to an open or close signal thereby controlling whether a charge can be transferred to or transferred from the battery cells. The switch 705 generally depicts an open connection in which a state of the rechargeable battery is in an inoperable state. The switch 710 generally depicts a closed connection in which a state of the rechargeable battery is in an operable state. As previously discussed, the state of being operable or inoperable may generally refer to the rechargeable battery being able to provide a charge and/or receive a charge. The switch 705/710 may include one or more transistors, such as a power MOSFET, and/or one or more mechanical switching assemblies, such as but not limited to an electronic relay.

In some examples, a fusible link 715 may reside between a power connection and a terminal 515A/515B. The fusible link 715 may provide a permanent capability to disable a charge and/or recharge capability of the rechargeable battery. For example, following an event indicative of an attempted theft and/or a detected drop event, the fusible link 715 may permanently render the rechargeable battery inoperable until the fusible link 715 is replaced. The fusible link 715 may open by intentionally causing an overcurrent condition to occur. As one example, a controlled short between the power cables 530A/530B may cause the fusible link 715 to open.

Figure 8:
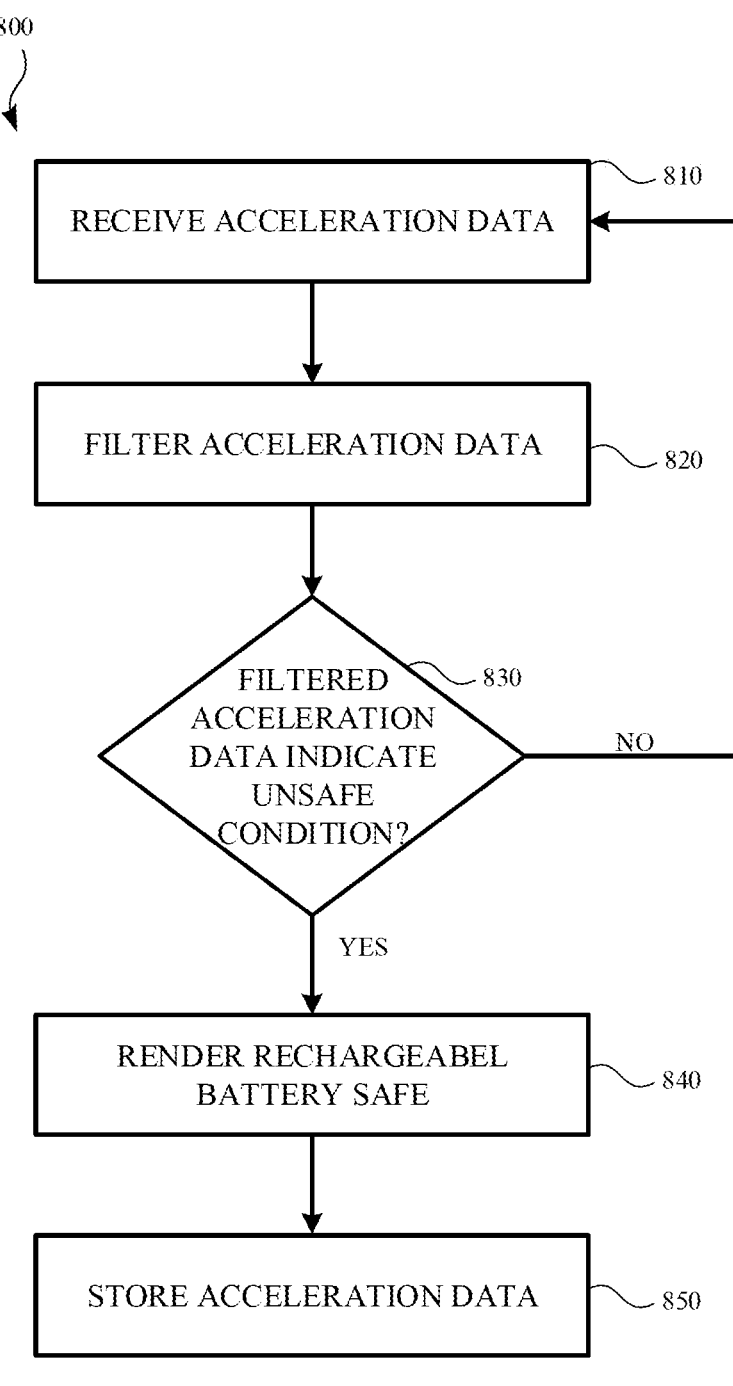
FIG. 8 illustrates a method for determining if a rechargeable battery has been subjected to one or more unsafe acceleration events according to one or more examples.

FIG. 8 illustrates a method 800 for rendering a charge and/or discharge capability of a rechargeable battery inoperable according to one or more examples. The method 800 may be performed by the rechargeable battery, a computing device of a user, and/or a network service such as described herein. A general order for the operations of the method 800 is shown in FIG. 8. The method 800 can include more or fewer steps or can be arranged in an order of steps differently than those shown in FIG. 8. The method 800 can be executed as a set of computer-executable instructions executed by a processor and memory and/or otherwise be encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, etc. described in conjunction with FIGS. 1-7.

The method 800 may continuously flow in a loop, flow according to a timed event, or flow according to a change in an operating or status parameter. Method 800 begins when acceleration data from one or more sensors associated with a battery is received (810). For example, one or more battery/power sensors 668 may provide acceleration data for analysis and further processing. In some examples, the acceleration data may be received at the processing unit 612; alternatively, or in addition, the acceleration data may be communicated to an entity external from the rechargeable battery via the communication system 636 and/or a communication network 636 for further processing and analysis (e.g., the network service). The acceleration data may be a raw measurement of acceleration.

The acceleration data may be filtered (820) as part of a processes for determining if a high force event has occurred. For example, acceleration data indicative of normal use and operation of a light electric vehicle may be removed such that high impact and/or force events may be isolated. In other examples, the acceleration data may be averaged over a specified window of time to provide a baseline measurement. In some examples, high frequency acceleration data may be removed using a band-pass filter such that acceleration data corresponding to a specified frequency range is analyzed. In yet other examples, acceleration data may be derived from different accelerometers requiring different filtering and analysis procedures. Alternatively, or in addition, the acceleration data may be converted in to a measured force based on a mass of an object, such as the rechargeable battery.

The filtered acceleration data may be further analyzed to determine (830) if an unsafe condition occurred, such as a drop event, crash, high impact shock, or otherwise. In some examples, an unsafe condition may be determined if a magnitude of acceleration is greater than a threshold. For example, if a measured acceleration is equal or greater than five times the force of gravity (e.g., 5Gs), the method 800 may be used to determine that an unsafe condition potentially exits. It should be understood that five times the force of gravity is for example purposes only and should not be considered limiting. Other threshold conditions may be more or less than five times the force of gravity and may be a measurement independent of and not referenced to gravity. In some examples, an unsafe condition may be determined if a force derived from the acceleration measurement exceeds a threshold. As many accelerometers measure acceleration in three dimensions, it should be understood that for any threshold or comparison purposes, a vector indicative of direction and magnitude may be used for indicating that a rechargeable battery has been subjected to a drop, crash, or other high impact event capable of damaging one or more components of the rechargeable battery.

In some examples, the threshold may be dependent on whether the rechargeable battery is connected to a light electric vehicle or a charging bay of a kiosk. Accordingly, the rechargeable battery may determine whether it is connected to the light electric vehicle or the charging kiosk and adjust a threshold accordingly. That is, the threshold for determining whether the battery has experienced an acceleration or force event that potentially causes an unsafe condition may be based on different thresholds depending on where the battery is located and/or how the battery is being used. For example, an unsafe condition may be determined by a predetermined threshold having a first value when the rechargeable battery is coupled to the light electric vehicle and a second value when the rechargeable battery is not coupled to the light electric vehicle.

In examples where the acceleration data, or data derived from the acceleration data, indicates that an unsafe event has occurred resulting in a potentially unsafe condition of the rechargeable battery, the method 800 may render (840) the rechargeable battery safe. For example, one or more or more switches may be opened to disable a charge and/or recharge ability of a rechargeable battery. In some examples, the fusible link may be blown, or otherwise opened, to disable a charge and/or recharge ability of a rechargeable battery. The process utilized to render the rechargeable battery safe may depend on the acceleration data and/or a previous condition of the rechargeable battery.

For example, the rechargeable battery may be designed to experience no more than five high impact events; if the rechargeable battery has experienced a sixth high impact event, one or more switches may be opened rendering the rechargeable battery safe. In other instances, sensor data from multiple sensors including one or more accelerometers may be utilized to determine an acceptable process for rendering the rechargeable battery safe. As one example, if the rechargeable battery is subjected to a high impact event and an internal temperature rise is detected, the battery may be rendered safe by causing the fusible link to open.

The acceleration data and any other information related to the status and/or condition of the rechargeable battery may be stored (850). In one example, such information is stored in the system memory 616. Alternatively, or in addition, the information is stored in the storage area 640.

Figure 9:
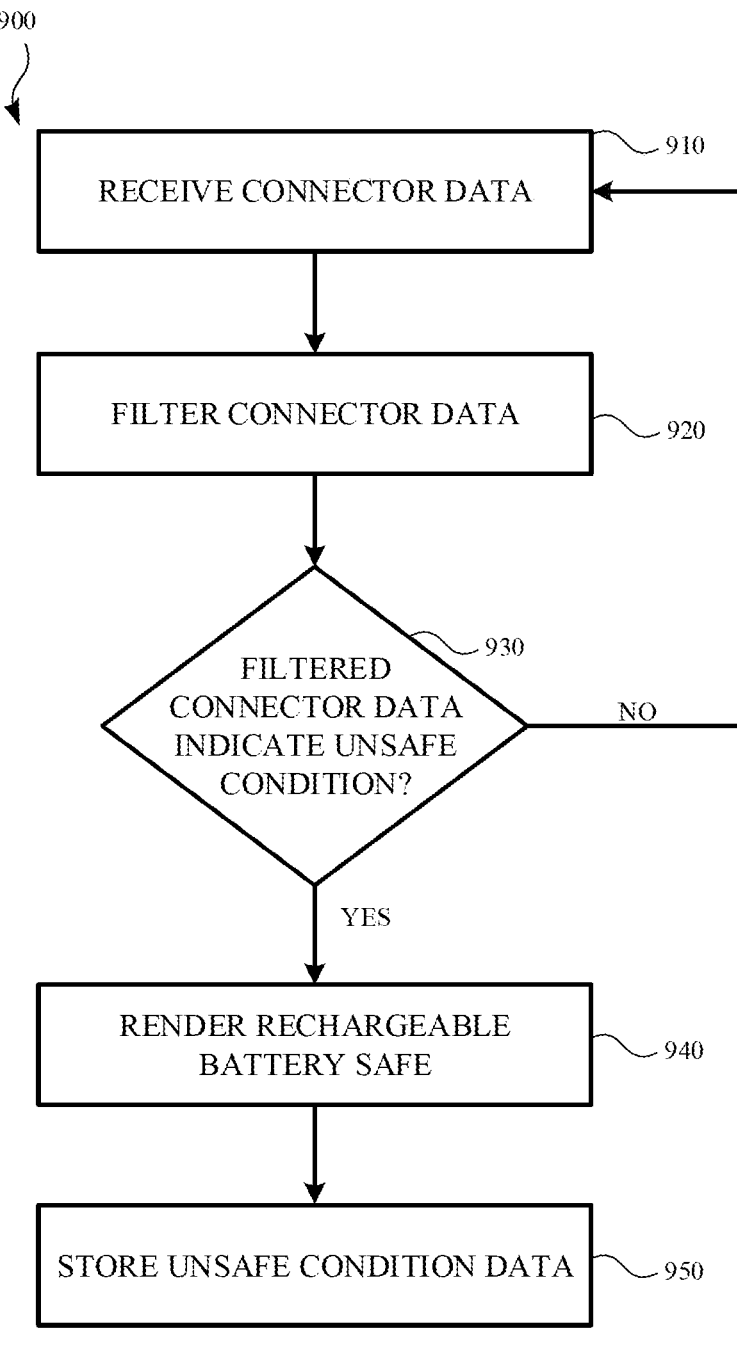
FIG. 9 illustrates a method for determining if a rechargeable battery has been subjected to one or more unsafe temperature events according to one or more examples.

FIG. 9 illustrates a method 900 for rendering a charge and/or discharge capability of a rechargeable battery inoperable according to one or more examples. The method 900 may be performed by the rechargeable battery, a computing device of a user, and/or a network service such as described herein. A general order for the steps of the method 900 is shown in FIG. 9. The method 900 can include more or fewer steps or can be arranged in an order of steps differently than those shown in FIG. 9. The method 900 can be executed as a set of computer-executable instructions executed by a processor and memory and/or otherwise be encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, etc. described in conjunction with FIGS. 1-8.

The method 900 may continuously flow in a loop, flow according to a timed event, or flow according to a change in an operating or status parameter. The method 900 begins when battery sensor data from one or more sensors is received (910) For example, one or more battery/power sensors 668 may provide acceleration data for analysis and further processing to a computing device of a user, to a battery charging kiosk and/or a network service. In some examples, battery sensor data may correspond to a temperature of one or more terminals 676. For example, the sensor data may originate from a thermistor 560. The temperature data may be received at the processing unit 612; alternatively, or in addition, the temperature data may be communicated to an entity external from the rechargeable battery via the communication system 636 and/or a communication network 636 for further processing and analysis.

The sensor data may be filtered (920) as part of a processes for determining a status and/or condition of the rechargeable battery. For example, if the temperature of the terminal exceeds a predetermined threshold, a status and/or condition of the battery may be indicated to responsible parties such that the rechargeable battery can be further evaluated. This can include sending the information to a computing device of a technician and/or communicating the information to a network service. In some instances, a temperature rise corresponding to a dirty terminal may be detected; in such instances, a higher than normal temperature may be detected causing an indication to be provided from the rechargeable battery indicating that the specific condition was experienced. In other examples, the sensor data may be averaged over a specified window of time to provide a baseline measurement.

The filtered sensor data can be further analyzed (930) to determine if an unsafe condition occurred, such as an unsafe temperature rise for example. In some examples, an unsafe condition may be determined if a magnitude of a temperature is greater than a threshold. For example, if a temperature of a terminal measures ninety degrees Celsius, the method 900 may determine that an unsafe condition potentially exits and communicate this information to the network service. It should be understood that ninety degrees Celsius is for example purposes only and should not be considered limiting. In other examples, a rate of temperature change greater than a threshold may indicate that an unsafe condition potentially exists.

In some examples, the threshold may be dependent on whether the rechargeable battery is connected to a light electric vehicle or a battery bay of a rechargeable battery kiosk. Accordingly, the rechargeable battery may determine whether it is connected to the light electric vehicle or the rechargeable battery kiosk and adjust a threshold. That is, a temperature threshold, for example, that determines whether the battery has experienced or is experiencing an unsafe event may be based on different thresholds depending on where the battery is located and/or how the battery is being used. As another example, an unsafe condition may be determined by a predetermined threshold having a first value when the rechargeable battery is coupled to the light electric vehicle and a second value when the rechargeable battery is not coupled to the light electric vehicle.

In examples where the sensor data, or data derived from the sensor data, such as a rate of change, indicates that an unsafe condition potentially exits at the rechargeable battery, the method 900 may render (940) the rechargeable battery safe. For example, one or more or more switches may be opened to disable a charge and/or recharge ability of a rechargeable battery. In some instances, the fusible link may be blown, or otherwise opened, to disable a charge and/or recharge ability of a rechargeable battery. The process utilized to render the rechargeable battery safe may depend on the sensor data and the sensor data received. For example, one or more switches may be opened rendering the rechargeable battery safe if a detected temperature rise is greater than a threshold. In other examples, sensor data from multiple sensors may be utilized to determine an acceptable process for rendering the rechargeable battery safe. As one example, if the rechargeable battery is subjected to a high temperature environment and an internal temperature is above a specific threshold, the battery may be rendered safe by causing the fusible link to open.

The sensor data and any other information related to the status and/or condition of the rechargeable battery may be stored (950). In one example, such information is stored in the system memory 616. Alternatively, or in addition, the information is stored in the storage area 640.

Figure 10:
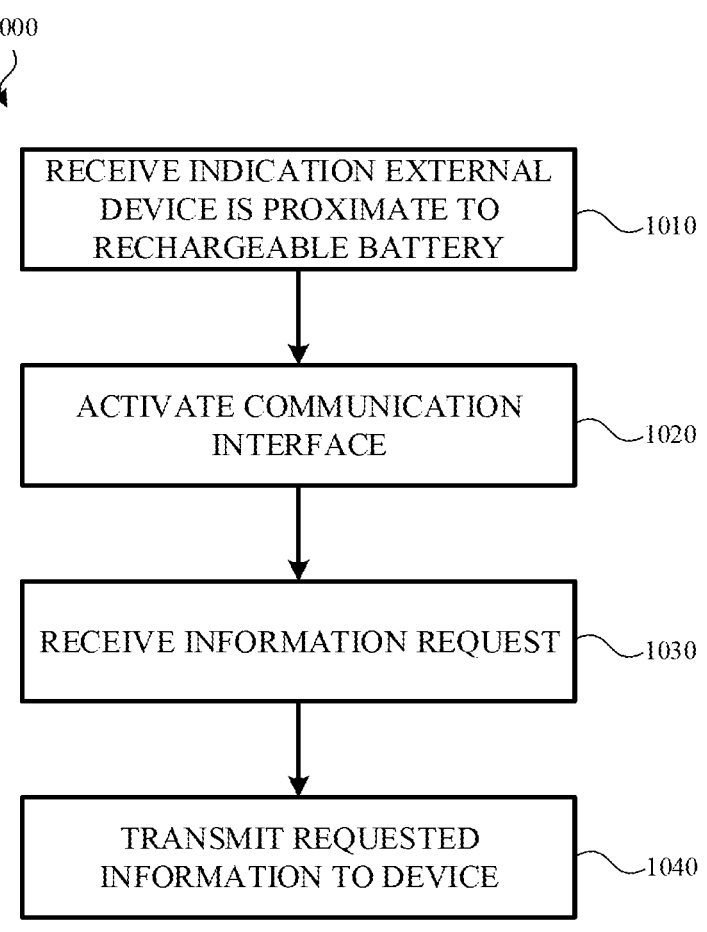
FIG. 10 illustrates a method for activating a communication interface and communicating with an external device according to one or more examples.

FIG. 10 illustrates a method 1000 for activating a communication interface of a rechargeable battery. The method 1000 may be performed by the rechargeable battery, a computing device of a user, and/or a network service such as described herein. A general order for the steps of the method 1000 is shown in FIG. 10. The method 1000 can include more or fewer steps or can be arranged in an order of steps differently than those shown in FIG. 10. The method 1000 can be executed as a set of computer-executable instructions executed by a processor and memory and/or otherwise be encoded or stored on a computer readable medium. Further, the method 1000 can be performed by gates or circuits associated with a processor, Application Specific Integrated Circuit (ASIC), a field programmable gate array (FPGA), a system on chip (SOC), or other hardware device. Hereinafter, the method 1000 shall be explained with reference to the systems, components, modules, software, etc. described in conjunction with FIGS. 1-9.

The method 1000 may continuously flow in a loop, flow according to a timed event, or flow according to a change in an operating or status parameter. Method 100 begins when an indication that an external device is proximate to the rechargeable battery is received (1010). The indication may correspond to a communication device being within range of the rechargeable battery, where the communication device may correspond to a battery holster 120 or 140 (FIG. 1) of a light electric vehicle, a charging bay of a rechargeable battery kiosk 150 (FIG. 1), a mobile device, or another device capable of receiving information from the rechargeable battery. For instance, an antenna 660 may receive an indication that an external communication device would like to communicate. The antenna 660 may provide such indication to the communication system 636. The communication system may then provide an indication to the battery management system that the communication device is attempting to communicate with the rechargeable battery. Either one of or both of the communication system 636 and the battery management system may cause the communication interface to be activated (1020). Accordingly, the rechargeable battery and the external communication device may establish an authorized communication session such that communication system may receive information (1030) from the external device and the communication system may send (1040) information to the external device.

The term computer-readable media as used herein may include computer storage media. Computer storage media may include volatile and nonvolatile, removable and non-removable media implemented in any method or technology for storage of information, such as computer readable instructions, data structures, or program modules.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A rechargeable battery, comprising:
   at least one battery cell;
   a housing containing a battery management system and the at least one battery cell;
   one or more sensors of the battery management system configured to detect an unsafe condition of the rechargeable battery;
   one or more power connectors configured to electrically connect the rechargeable battery to a light electric vehicle; and
   a communication system communicatively coupled to the battery management system, wherein the communication system is configured to wirelessly communicate information indicative of the unsafe condition of the rechargeable battery received from the battery management system to a server via a network communication channel.

2. The rechargeable battery of claim 1, wherein the communication system wirelessly communicates the information while the rechargeable battery is in a charging state.

3. The rechargeable battery of claim 1, wherein the communication system wirelessly communicates the information to the server while the battery management system is in an inactive state.

4. The rechargeable battery of claim 1, wherein the battery management system determines whether the rechargeable battery is coupled to the light electric vehicle.

5. The rechargeable battery of claim 1, further comprising:
   at least one transistor communicatively coupled to the battery management system and the at least one battery cell; and
   a sensor communicatively coupled to the battery management system to measure at least one attribute associated with the rechargeable battery, wherein when the at least one attribute exceeds a predetermined threshold, the battery management system changes a state of the at least one transistor.

6. The rechargeable battery of claim 5, wherein the predetermined threshold has a first value when the rechargeable battery is coupled to the light electric vehicle and the predetermined threshold has a second value when the rechargeable battery is not coupled to the light electric vehicle.

7. The rechargeable battery of claim 6, wherein the sensor is a thermistor communicatively coupled to the battery management system to determine a temperature of one or more terminals of the rechargeable battery.

8. The rechargeable battery of claim 1, wherein the communication system wirelessly communicates information received from the battery management system to the server using at least one of a near-field communication (NFC) protocol.

9. The rechargeable battery of claim 5, wherein the predetermined threshold has a first value when the rechargeable battery is coupled to the light electric vehicle and the predetermined threshold has a second value when the rechargeable battery is coupled to a battery charging kiosk.

* * * * *